United States Patent [19]
Whelan

[11] Patent Number: 5,808,369
[45] Date of Patent: Sep. 15, 1998

[54] WINDTRAP FOR POWER DEVELOPMENT

[76] Inventor: Matthew P. Whelan, Colliers, Conception Bay newfoundland, Canada, A0A 1Y0

[21] Appl. No.: 718,764

[22] Filed: Sep. 23, 1996

[30] Foreign Application Priority Data

Sep. 25, 1995 [CA] Canada ................................. 2159019

[51] Int. Cl.⁶ .................................. F03D 9/00; H02P 9/04
[52] U.S. Cl. ................................ 290/55; 290/44; 290/54; 46/117; 46/119
[58] Field of Search .............................. 290/54, 551, 44; 416/119, 132 B, 117, 240, 132

[56] References Cited

U.S. PATENT DOCUMENTS

| | | | |
|---|---|---|---|
| 3,944,839 | 3/1976 | Carter | 290/55 |
| 4,015,911 | 4/1977 | Darvishian | 46/119 |
| 4,142,832 | 3/1979 | Clifton | 416/117 |
| 4,191,507 | 3/1980 | DeBerg | 416/117 |
| 4,310,284 | 1/1982 | Randolph | 416/132 B |
| 4,377,372 | 3/1983 | Stutzman | 416/119 |
| 4,496,283 | 1/1985 | Kodric | 415/44 |
| 4,534,703 | 8/1985 | Flavall | 416/119 |
| 4,681,512 | 7/1987 | Barnard | 416/132 B |
| 5,226,806 | 7/1993 | Lubbers | 416/132 B |
| 5,525,037 | 6/1996 | Cummings | 416/117 |
| 5,616,963 | 4/1997 | Kikuchi | 290/55 |

FOREIGN PATENT DOCUMENTS

| | | | |
|---|---|---|---|
| 1200876 | 9/1977 | Australia | 290/55 |
| 885867 | 2/1981 | Belgium | 290/55 |
| 368392 | 11/1906 | France | 290/55 |
| 9104412 | 4/1991 | WIPO | 290/55 |

OTHER PUBLICATIONS

Canadian Patent Application Serial No. 2,007,030, filed Jan. 3, 1990, published Jul. 3, 1991, now abandoned, of Matthew P. Whelan for "A Windtrap for Power Development".

Canadian Patent Application Serial No. 2,046,752, filed Jul. 10, 1991, published Jan. 11, 1993, now abandoned, of Matthew P. Whelan for "Windtrap for Power Development".

Primary Examiner—Steven L. Stephan
Assistant Examiner—Elvin G. Enad
Attorney, Agent, or Firm—Baker & Botts. L.L.P.

[57] ABSTRACT

A wind power generator comprises a shaft operatively mounted in a support frame for rotation about a substantially vertical axis. A wing arm is fixedly mounted on the shaft and extends radially outward therefrom. Finally, a windtrap assembly is disposed proximal an outer end of the wing arm. The windtrap assembly includes respective upper and lower windtrap panels pivotably connected to the wing arm. The upper and lower windtrap panels are capable of folding together to cooperatively assume a low-drag configuration when the windtrap assembly is moving in an up-wind direction, and further capable of opening away from each other to cooperatively assume a high-drag configuration when the windtrap assembly is moving in a down-wind direction.

13 Claims, 5 Drawing Sheets

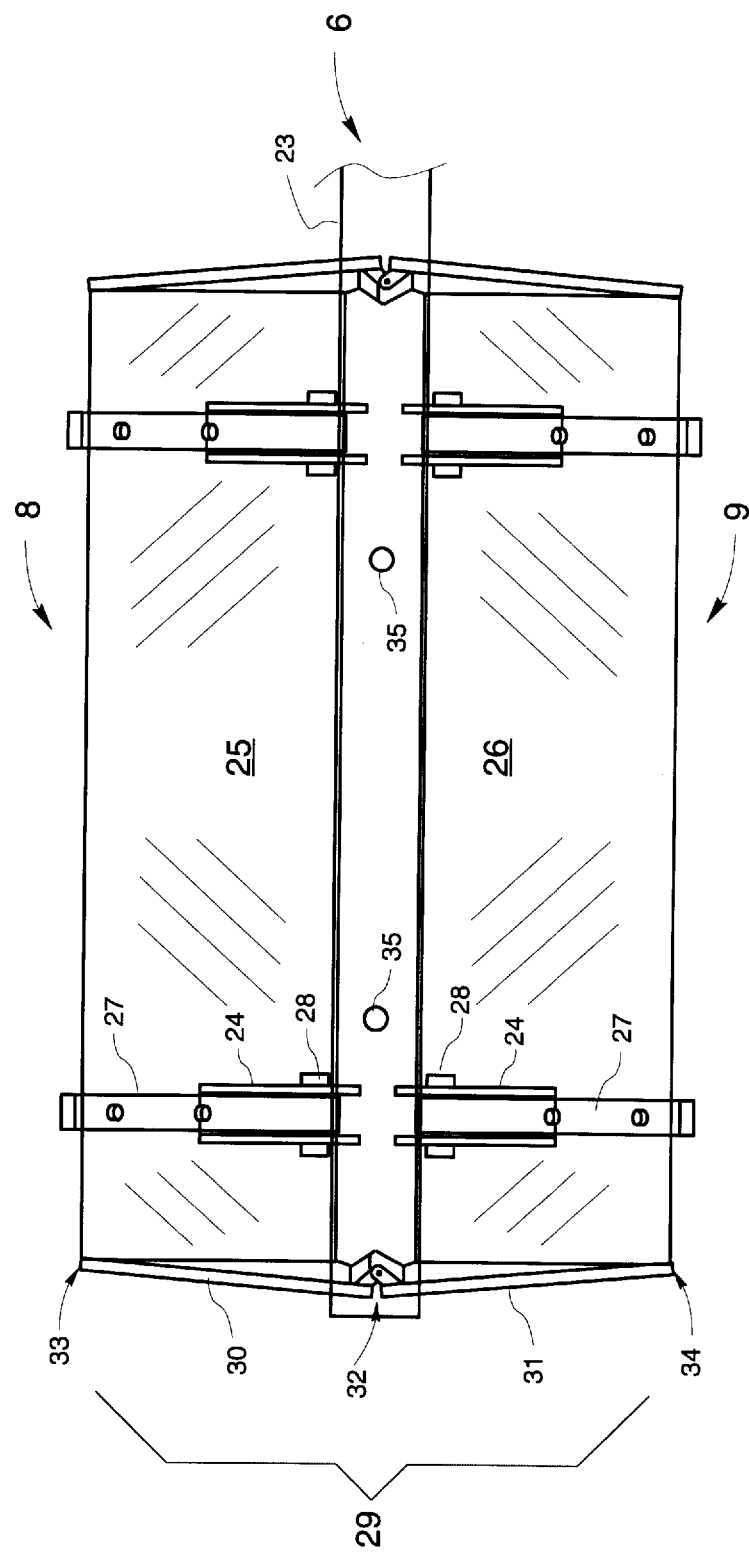

WINDTRAP FOR POWER DEVELOPMENT

BACKGROUND OF THE INVENTION

The present invention relates to a wind power generator for developing power from the wind, and in particular to a wind power generator apparatus having a vertical shaft.

Of the conventional vertical shaft wind power generators, the best known are the "Darrius" and the "Savonius". The Darrius wind power generator has reasonably high efficiency, but tends to be slow starting, and loses significant energy due to slippage on the power side of the shaft and wind resistance on the return side of the shaft. The Savonius wind power generator has very little slippage on the power side of shaft, but loses much energy to wind resistance on the return side of the shaft.

BRIEF SUMMARY OF THE INVENTION

It is therefore an object of the present invention to provide a vertical shaft wind power generator apparatus in which losses due to both slippage on the power side of the shaft and wind resistance on the return side of the shaft are minimized.

Accordingly, an aspect of the present invention provides a wind power generator comprising a support frame. A shaft is operatively mounted in the support frame for rotation about a substantially vertical axis. A wing arm is fixedly mounted on the shaft and extends radially outward therefrom. Finally, a windtrap assembly is disposed proximal an outer end of the wing arm. The windtrap assembly includes respective upper and lower windtrap panels pivotably connected to the wing arm. The upper and lower windtrap panels are capable of folding together to cooperatively assume a low-drag configuration when the windtrap assembly is moving in an up-wind direction, and further capable of opening away from each other to cooperatively assume a high-drag configuration when the windtrap assembly is moving in a down-wind direction.

Preferably, there is at least one pair of wing arms and respective windtrap assemblies disposed on the shaft for rotation about the vertical axis in a common plane. The wing arms of the pair extend in opposite directions from the shaft, such that when one windtrap assembly of the pair is moving in an up-wind direction the other windtrap assembly of the pair is moving in a corresponding down-wind direction.

In an embodiment of the invention, there are a plurality of pairs of wing arms and respective windtrap assemblies arranged in a vertically stacked manner on the shaft. Each of the pairs are preferably separated from adjacent pairs by a predetermined angle, so that the plurality of pairs of support arms and respective windtrap assemblies cooperate to from a helical arrangement of windtrap assemblies surrounding the shaft.

For example, an embodiment of the invention provides 5 pairs of wing arms and respective windtrap assemblies, and the angle of separation between adjacent windtrap assemblies 36 degrees. By this arrangement, the ten individual windtrap assemblies are evenly distributed about the shaft, so that the wind power generator can operate with minimum surge or vibration.

Each of the windtrap panels can conveniently be formed of a substantially rigid frame member which includes respective pivot holes, and a flexible sail member secured to the frame member. This allows construction of a windtrap panel having high strength and light weight. A pivot pin can conveniently extend through the respective pivot holes of the upper and lower windtrap panels. The pivot pin can further be secured to the wing arm so as to thereby pivotably connect the upper and lower windtrap panels to the wing arm.

In an embodiment of the invention, a stopper member is mounted on the wing arm to prevent the upper windtrap panel from pivoting past horizontal under the influence of gravity and/or wind forces. Similarly, a spring element, such as a torsion spring, can be connected between the wing arm and the lower windtrap panel. This spring element supports a portion of the weight of the lower windtrap panel, whereby, when the windtrap assembly is moving in an up-wind direction the force of the wind can raise the lower windtrap panel to an approximately horizontal position to thereby minimize drag, and when the windtrap assembly is moving in a down-wind direction the force of the wind can move the lower windtrap panel downwards to maximize drag. Preferably, the spring element is capable of supporting between 60% and 70% of the weight of the lower windtrap panel.

In an embodiment of the invention the wing arm includes a pair of vertically separated parallel arm members extending radially outwards from the shaft. An outer cradle member is connected between the free ends of the arm members, and an inner cradle member is connected between the arm members at a position between the shaft and the outer cradle member. In this case, the upper and lower windtrap panels are pivotably connected to the inner and outer cradle members between the arm members.

In an alternative embodiment of the invention the wing arm comprises a single arm member extending radially outwards from the shaft, and upper and lower pairs of cradle members fixedly attached to the arm member. In this case the upper and lower windtrap panels are pivotably connected to the upper and lower pairs of cradle members, respectively.

BRIEF DESCRIPTION OF THE DRAWINGS

FIG. 4 illustrates a second embodiment of a windtrap assembly used in a wind power generator apparatus in accordance with the present invention, in the open position.

DETAILED DESCRIPTION OF THE INVENTION

Figure 1:
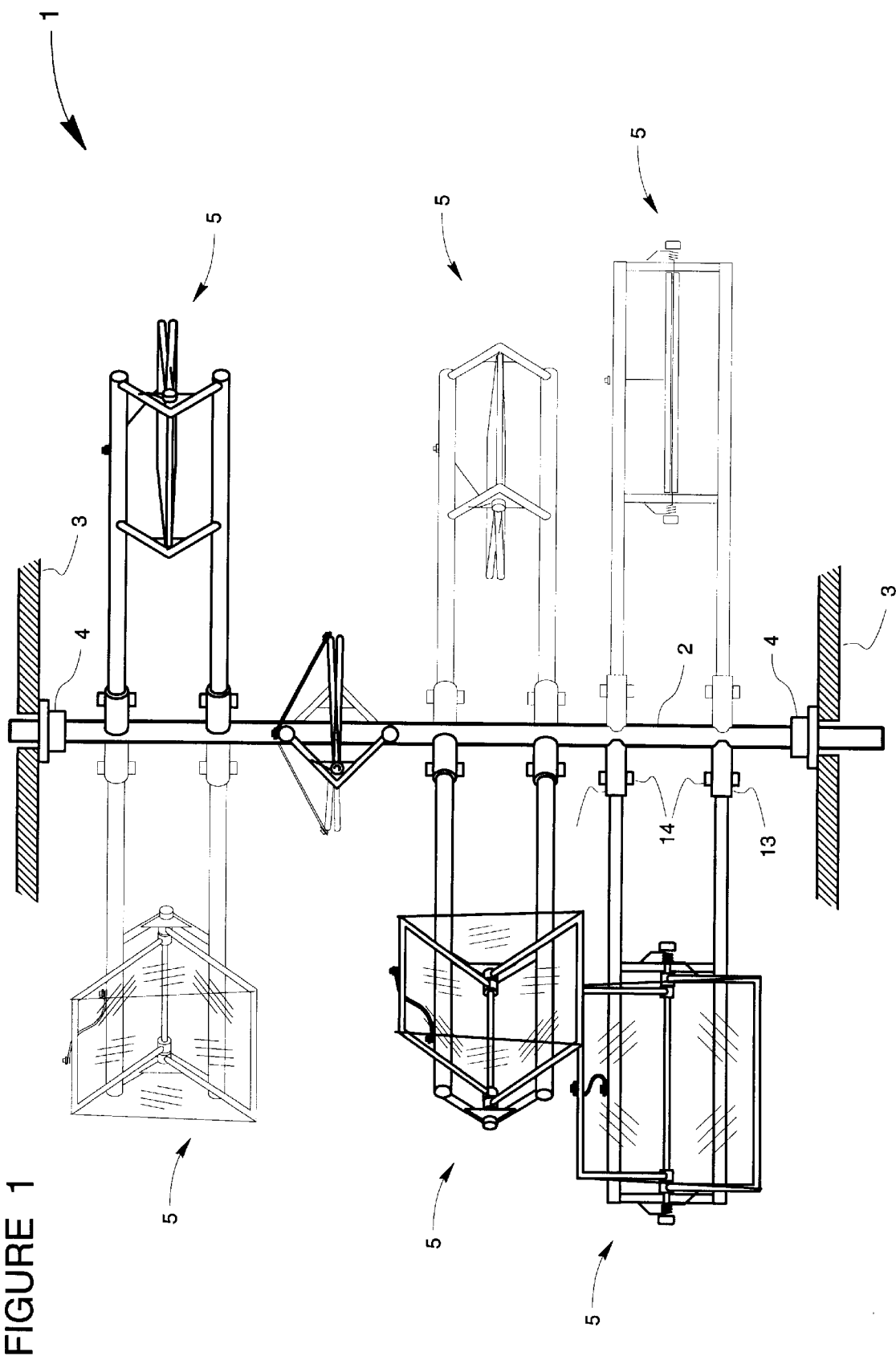
FIG. 1 illustrates a wind power generator apparatus in accordance with an embodiment of the present invention.

Referring now to FIG. 1, a wind power generator 1 according to the present invention includes a shaft 2 rotatably mounted within a support frame 3. The support frame 3 can be of any convenient construction capable of providing adequate strength and rigidity to hold the wind power generator 1 against wind forces, while at the same time allowing wind to pass through the support frame, and thereby act on the active portions of the wind power generator I with minimum interference. The shaft 2 is arranged substantially vertically within the support frame 3, and is mounted for rotation on suitable bearings 4. Virtually any type of conventional bearings may be used to support the shaft 2, although low friction ball or roller bearings will preferably be used, so as to minimize frictional losses. The use of so-called "permanently sealed" and "permanently lubricated" bearings will minimize bearing wear and reduce maintenance requirements.

Power generator equipment (not shown) capable of converting the mechanical rotational motion of the shaft 2 into electrical power is operatively coupled to the shaft 2. Such power generators, mechanical couplings, and associated power conversion, storage and control equipment are well known within the wind power generator field, and thus will not be discussed in further detail here.

As illustrated in FIG. 1, a plurality (four in the illustrated embodiment) of pairs of windtrap assemblies 5 are mounted on the shaft. Each pair of windtrap assemblies 5 is offset from its neighbouring pairs of windtrap assemblies 5 by a predetermined vertical and angular offset, thereby forming a "double-helix" of windtrap assemblies 5 surrounding the shaft 2. The vertical offset between adjacent pairs of windtrap assemblies 5 is selected to minimize interference between adjacent pairs of windtrap assemblies 5, and to facilitate ease of assembly. The angular offset between adjacent pairs of windtrap assemblies 5 is selected to ensure that windtrap assemblies 5 are evenly spaced about the shaft 2, and thus is based on the number of windtrap assemblies 5 used. For example, in the embodiment illustrated in FIG. 1, four pairs of windtrap assemblies 5 are used. Accordingly, the angular separation between adjacent wind trap assemblies 5 will be 360°/(4×2)=45°. Similarly, if five pairs of windtrap assemblies 5 were used, then the angular separation between adjacent wind trap assemblies would be 360°/(5×2)=36°. Evenly spacing the windtrap assemblies 5 about the shaft 2 in this manner allows the wind power generator I of the present invention to operate substantially free of surge or vibration. In this context, it will be apparent that increasing the number of windtrap assemblies 5 will tend to increase the smoothness of operation, but at the cost of increasing the number of components of the overall system. In practice, it has been found that the use of five pairs of windtrap assemblies 5 provides the optimum balance between smoothness of operation and number of components. However, for convenience of illustration, an embodiments using four pairs of windtrap assemblies 5 is shown in FIG. 1.

Figure 2:
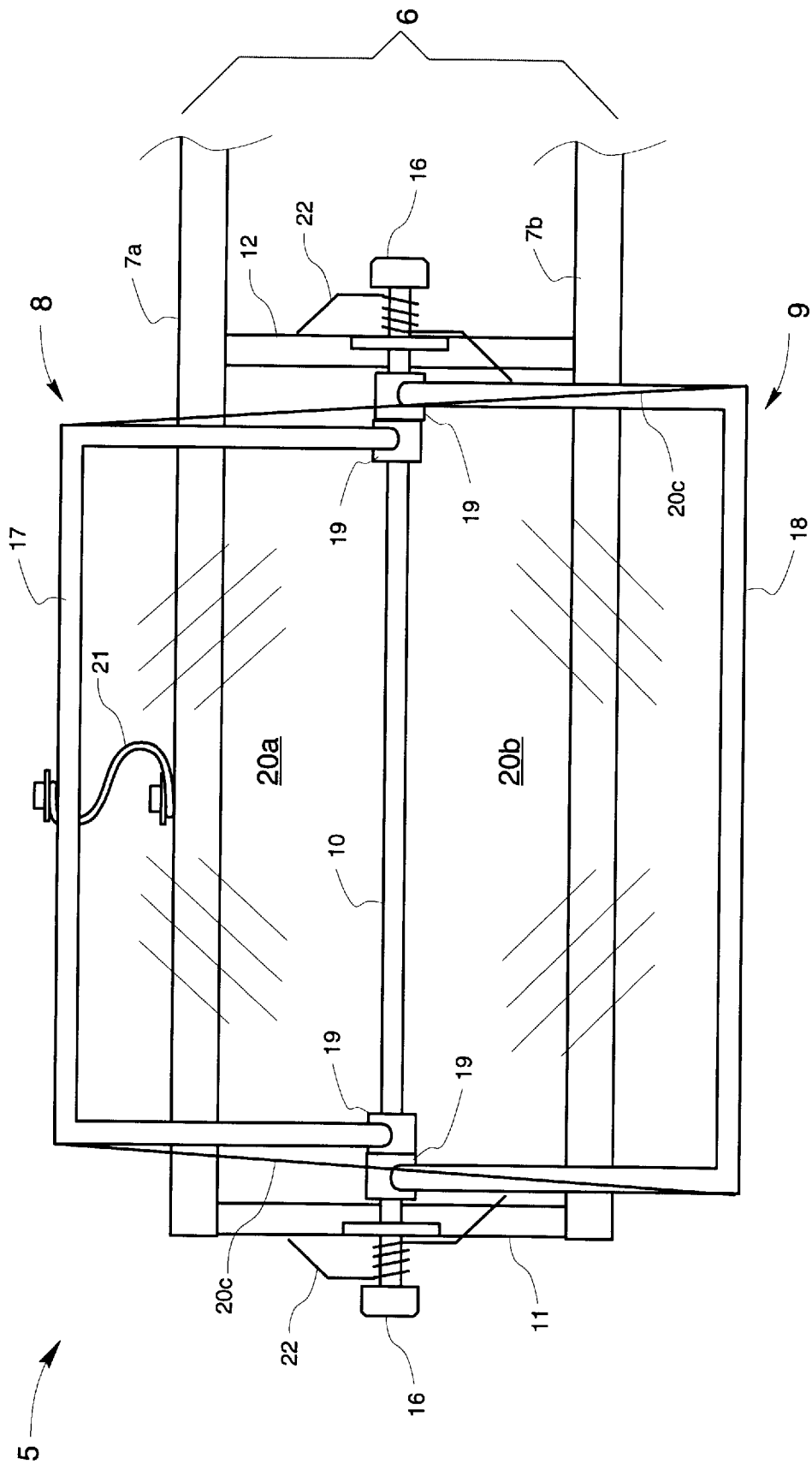
FIG. 2 illustrates an embodiment of a windtrap assembly used in a wind power generator apparatus in accordance with the present invention, in the open position.

Referring now to FIGS. 1, 2 and 3 together, each windtrap assembly 5 is supported by a wing arm 6 comprising a pair of parallel arm members 7a, 7b which extend radially from the shaft 2. A pair of windtrap panels 8,9 are pivotally mounted on the wing arm 6 via a pivot pin 10 and cradle members 11,12.

The wing arm 6 can be constructed of any suitable material, such as, for example, steel or aluminum tube, and can be conveniently coupled to the shaft 2 using sockets 13 attached to the shaft 2 (for example by welding) and bolts, pins, or other suitable fasteners 14.

The cradle members 11,12 are affixed near the outer end of the wing arm 6. In the embodiment illustrated in FIGS. 1–3, the cradle members 11,12 extend between the arm members 7a, 7b, and also serve to structurally link the free ends of the arm members 7a, 7b to form a more rigid supporting structure for the windtrap assembly 5. As shown in FIG. 3, the cradle members 11,12 are V-shaped in profile, forming approximately a 900 angle at the apex. A gusset plate 15 mounted at the apex of the cradle members 11,12 serves to further increase rigidity, and provides a convenient mounting structure for supporting the pivot pin 10.

The pivot pin 10 is conveniently formed from an elongate rod, preferably of steel, which extends between the two cradle members 11,12, providing a structural link between the windtrap panels 8,9 and cradle members 11,12. Suitable securement elements 16 (such as, for example, nuts, cotter pins or the like) are provided at each end of the pivot pin 10 to prevent the pivot pin 10 from becoming detached during extended periods of operation.

Each of the windtrap panels 8,9 includes a respective frame member 17,18 which is pivotally mounted on the pivot pin by means of respective bushings 19. The frame members 17,18 are preferably of comparatively high strength, low weight construction, and can be of any conveniently suitable material such as, for example, thin steel rod or aluminum tube. A sail member 20, preferably composed of a light-weight, high-strength fabric (such as, for example, canvas or Nylon) is secured to the frame members 17,18 by convenient means (e.g. by stitching). As illustrated in FIGS. 1–3, the sail member 20 is preferably formed in the shape of an open prism, defined by upper and lower portions 20a and 20b and side portions 20c. The upper and lower portions 20a and 20b are respectively secured to the upper and lower frame members 17 and 18. The side portions 20c are generally triangular in shape, and extend between the ends of the frame members 17 and 18.

Figure 3A:
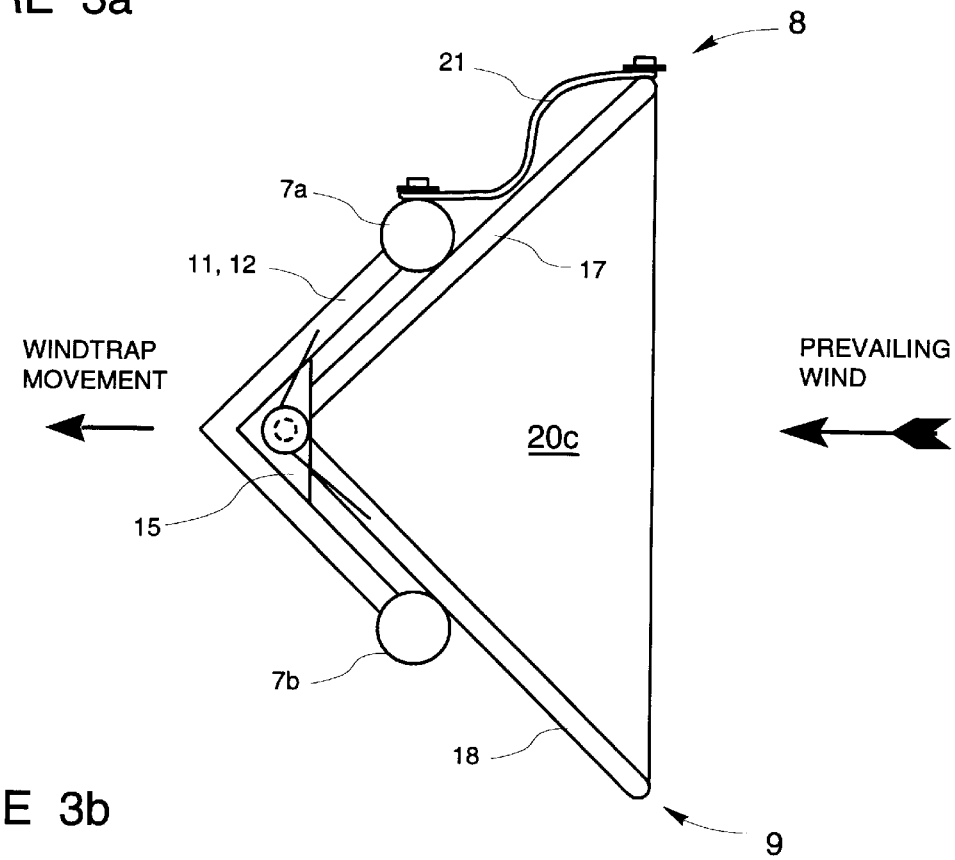
FIG. 3a and 3b show side views of the windtrap assembly of FIG. 2, in which the windtrap assembly is respectively illustrated in open and closed positions.

As shown in FIG. 3a, when the windtrap assembly 5 is moving in a downwind direction, the windtrap panels 8,9 are driven by the force of the wind to their open position. In this situation, the windtrap assembly 5 offers maximum wind resistance, whereby the force of the wind drives the windtrap assembly 5 downwind to turn the shaft 2 and generate power. Conversely, when the windtrap assembly 5 is moving in an upwind direction (see FIG. 3b), the windtrap panels 8,9 are driven by the force of the wind to their closed position. In this situation, the windtrap assembly 5 offers minimum wind resistance, whereby the windtrap assembly 5 can be moved upwind by rotation of the shaft 2 without causing a substantial loss of power.

Figure 3B:
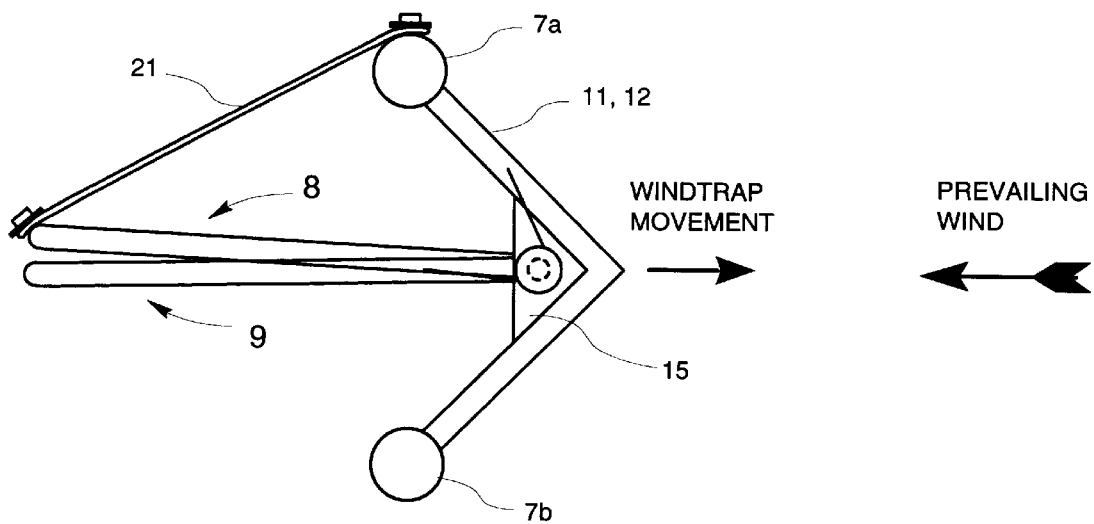

In order to facilitate the opening and closing of the windtrap panels 8,9, a tie-member 21 and spring elements 22 are provided. The tie member 21 is secured between the upper arm member 7a and the frame member 17 of the upper windtrap panel 8. The length of the tie member 21 is selected so that the upper windtrap panel 8 is prevented from falling below horizontal. As a result, when the windtrap assembly 5 is travelling upwind as shown in FIG. 3b, the upper windtrap panel 8 drops down under the force of gravity and wind pressure to assume the approximately horizontal (i.e. low drag) position illustrated. However, when the windtrap assembly 5 is travelling down-wind as shown in FIG. 3a, the upper windtrap panel 8 can be easily lifted by the force of the wind to assume the opened (i.e. high drag) position illustrated.

The spring elements 22, which can conveniently be formed as torsion springs mounted at either end of the pivot pin 10, are operatively connected between the cradle members 11,12 and the frame 18 of the lower windtrap panel 9. The spring elements 22 are arranged to support at least a portion of the weight of the lower windtrap panel 9. Preferably, the spring members support between 60% and 70% of the weight of the lower windtrap panel 9. As a result, when the windtrap assembly 5 is travelling down-wind as shown in FIG. 3a, the lower windtrap panel 9 drops down under the force of gravity and wind pressure to assume the open (i.e. high drag) position illustrated. However, when the windtrap assembly is travelling up-wind as shown in FIG. 3b, the lower windtrap panel 9 can be easily lifted by the force of the wind, assisted by the spring elements 22 to assume the approximately horizontal (i.e. low drag) position illustrated.

As shown in FIG. 1, from the point of view of the prevailing wind (directed into the page in FIG. 1), the windtrap assemblies 5 on one side of the shaft (to the left in FIG. 1) are oriented in a down-wind direction, and thus will be in a high-drag, power-generating condition. At the same time, the windtrap assemblies 5 on opposite side of the shaft 2 will be oriented in an up-wind direction, and thus will be in a low-drag condition. The resulting imbalance between drag forces acting on the windtrap assemblies 5 on respective opposite sides of the shaft 2 produces a torque about the shaft 2 which drives the shaft 2 to generate power. Since the shaft 2 is mounted substantially vertically, and the windtrap assemblies 5 are evenly distributed about the shaft 2, this operation will be effectively independent of the wind direction. Accordingly, no mechanism is required to compensate for changes in wind direction.

Furthermore, it will be seen that both the torque about the shaft 2, and the net force (directed downwind) acting on the shaft 2 and bearings 4 is essentially only a function of the speed difference between the down-wind-moving windtrap assemblies 5 and the prevailing wind. Accordingly, in cases where extremely high wind speeds are encountered (e.g. during a storm), excessive forces on the shaft can be avoided by discoupling the power generator equipment (not shown) from the shaft 2. This effectively allows the shaft 2 to turn freely, with the down-wind-moving windtrap assemblies moving at or close to the speed of the prevailing wind and thereby minimizing total wind forces acting of the wind power generator 1 as a whole.

Figure 5:
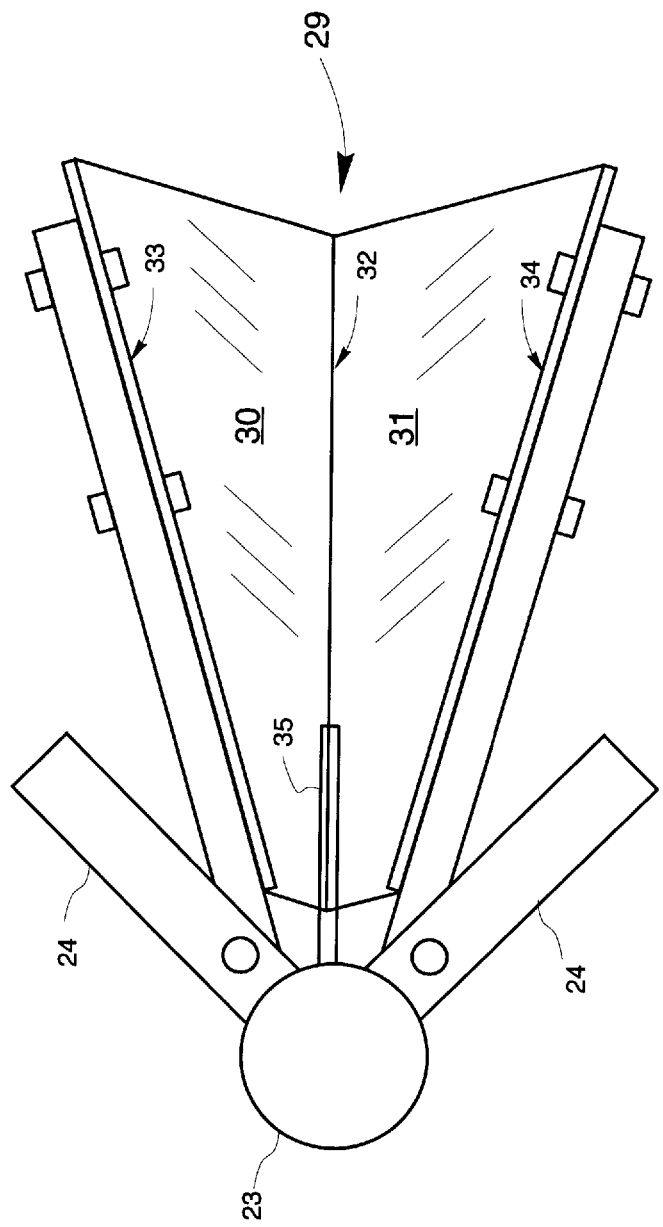
FIG. 5 shows a side view of the windtrap assembly of FIG. 4, in which the windtrap assembly is illustrated in a partially open position.

Referring now to FIGS. 4 and 5, an alternative embodiment of a windtrap assembly is 5 illustrated. In this embodiment, the two arm members 7a, 7b illustrated in FIGS. 1–3 are replaced by a single arm member 23. Additionally, the V-shaped cradle members 11,12 of the previous embodiment are replaced by four channel-shaped cradle elements 24 affixed to the arm member 23 (such as, for example, by welding).

The upper and lower windtrap panels 8,9 are formed by substantially rigid plates 25,26 (such as, for example, of moulded plastic) pivotally attached to the cradle elements 24 through supporting struts 27 and suitable pivot pins 28. In addition, the windtrap assembly 5 includes a pair of side panels 29 linking the upper and lower windtrap panels 8,9. As shown in FIG. 5, each of the side panels 29 are composed of two generally triangular side panel elements 30,31 which are pivotally connected to each other along a common hinge line 32. The side panel elements 30,31 are pivotally connected to the upper and lower windtrap panels 8,9 along similar hinge lines 33,34. Each of the hinges 32–34 may conveniently be formed as a "piano-type" hinge, which, in the case of plastic materials, can be premoulded. By means of this construction, the windtrap assembly 5 is capable of opening into a high drag box-like form while travelling down-wind, folding flat to minimize wind resistance while travelling back up-wind.

In order to ensure that the side panels 29 consistently fold outwards, the side panel elements 30,31 are suitably dimensioned so that when the upper and lower windtrap panels 8,9 are in their fully opened position, the side panels 29 are bent slightly outwards as illustrated in FIG. 4. In addition, one or more rods 35 can be secured to the wing arm to support the upper windtrap panel 8 in a horizontal position, thereby ensuring that wind forces can lift and open the upper windtrap panel 8 when the windtrap assembly 5 is moving down-wind. Finally, one or more spring elements (not shown in FIGS. 4 and 5) can be operatively connected between the lower windtrap panel 9 and the respective cradle members 24, so as to facilitate opening and closing of the lower windtrap panel 9 in essentially the same manner as described above in connection with the embodiment of FIGS. 1–3.

It will be apparent to those skilled in the art that the present invention may be modified in many different ways, without departing from the intended scope of the appended claims. For example, the embodiment of the windtrap described above in connection with FIGS. 1–3 was described as including a flexible fabric sail member 20 secured to upper and lower windtrap panel frames 17,18. However, it will be readily apparent that rigid panels (for example formed of moulded plastic could be employed instead. Similarly, the rigid panels described in connection with FIGS. 4 and 5 could equally be replaced by fabric sail elements secured to light-weight frames.

I claim:

1. A windtrap for power development comprising;

a support frame:

a shaft operatively mounted in the support frame for rotation about a substantially vertical axis:

a wing arm fixedly mounted on the shaft and extending radially outward therefrom a windtrap assembly disposed proximal an outward end of the wing arm. the windtrap assembly including respective upper and lower windtraps panels pivotably connected to the wing arm such that the upper and lower windtrap panels are capable of folding together to cooperatively assume a low-drag configuration when the windtrap assembly arm is moving in an up-wind direction and further capable of opening away from each other to cooperatively assume a high-drag configuration when the windtrap assembly is moving in a down-wind direction, each of said upper and lower windtrap panels in turn comprising:

a substantially rigid frame member including respective pivot holes: and a flexible sail member secured to said frame members:

a spring element operatively connected between said wing arm and said lower windtrap panel, said spring element partially supporting said lower windtrap panel, whereby, when the windtrap assembly is moving in an up-wind direction the force of the wind can lift the lower windtrap panel to an approximately horizontal position to thereby minimize drag, and when the windtrap assembly is moving in a down-wind direction the force of the wind can move the lower windtrap unit downwards to maximize drag.

2. A windtrap for power development as claimed in claim 1, wherein there is at least one pair of wing arms and respective windtrap assemblies disposed on the shaft, for rotation in a common plane about said vertical axis, the wing arms of said pair extending in opposite directions from the shaft such that when one windtrap assembly of said pair is moving in an up-wind direction the other windtrap assembly of said pair is moving in a corresponding down-wind direction.

3. A windtrap for power development as claimed in claim 2, comprising a plurality of pairs of wing arms and respective windtrap assemblies disposed in a vertically stacked arrangement on said shaft, each of said pairs being separated from an adjacent pair by a predetermined angle whereby said plurality of pairs of wing arms and respective windtrap assemblies cooperate to form a helical arrangement of windtrap assemblies surrounding said shaft.

4. A windtrap for power development as claimed in claim 3, wherein there are 5 pairs of wing arms and respective windtrap assemblies, and wherein adjacent windtrap assemblies are at an angle of separation of 36 degrees.

5. A windtrap for power development as claimed in claim 1 where said sail member comprises an upper portion secured to an upper frame member, a lower portion secured to a lower frame member, and a pair of end portions secured between opposite ends of said upper and lower frame members.

6. A windtrap for power development as claimed in claim 1, wherein said windtrap assembly further comprises a pivot pin extending through the respective pivot holes of said upper and lower windtrap panels, said pivot pin being secured to said wing arm so as to thereby pivotably secure said upper and lower windtrap panels to said wing arm.

7. A windtrap for power development as claimed in claim 1, further comprising a stopper member mounted on said wing arm to prevent said upper windtrap panel from pivoting past horizontal under the influence of gravity and/or wind forces.

8. A windtrap for power development as claimed in claim 1, wherein said spring element is capable of supporting between 60% and 70% of the weight of said lower windtrap panel.

9. A windtrap for power development as claimed in claim 1, wherein said wing arm comprises a pair of vertically separated parallel arm members extending radially outwards from said shaft, an outer cradle member connected between the free ends of said arm members and an inner cradle member connected between the arm members at a position between said shaft and said outer cradle member, said upper and lower windtrap panels being pivotably connected to said inner and outer cradle members between said arm members.

10. A windtrap for power development as claimed in claim 1, wherein said wing arm comprises a single arm member extending radially outwards from said shaft, and upper and lower pairs of cradle brackets fixedly attached to said arm member, said upper and lower windtrap panels being pivotably connected to said upper and lower pairs of cradle brackets, respectively.

11. A windtrap for power development comprising:
a support frame;
a shaft operatively mounted in the support frame for rotation about a substantially vertical axis;
a wing arm fixedly mounted on the shaft and extending radially outward therefrom:
a windtrap assembly disposed proximal to an outward end of the wing arm, the windtrap assembly including respective upper and lower windtrap panels pivotably connected to the wing arm such that the upper and lower windtrap panels are capable of folding together to cooperatively assume a low-drag configuration when the windtrap assembly arm is moving in an up-wind direction, and further capable of opening away from each other to cooperatively assume a high-drag configuration when the windtrap assembly is moving in a down-wind direction: wherein.
each of said upper and lower windtrap panels comprises a generally rectangular panel of substantially rigid material and said windtrap assembly further comprises a pair of side panels secured to respective opposite ends of said upper and lower windtrap panels, each of said side panels comprising a pair of generally triangular side panel elements pivotally connected to each other along a first hinge-line, and to respective ones of said upper and lower panels along respective second and third hinge-lines, whereby, when the windtrap assembly is moving in a downwind direction the windtrap assembly opens into a high drag box-like form, and when the windtrap assembly is moving in an upwind direction the windtrap assembly collapses into a flattened low drag form.

12. A windtrap for power development as claimed in claim 11, wherein a maximum width of said side panels is greater than a maximum separation between said upper and lower windtrap panels, whereby when said upper and lower windtrap panels are in their fully opened position said side panels are bent at an obtuse angle, thereby ensuring that said side panels easily fold to permit said upper and lower windtrap panels.

13. A windtrap for power development as claimed in claim 11, wherein each of said hinge-lines constitutes a plastic piano-type hinge.

\* \* \* \* \*